United States Patent [19]

Roark et al.

[11] 4,377,053
[45] Mar. 22, 1983

[54] TELESCOPING PROP PARTICULARLY ADAPTED FOR SUPPORT OR SPREADING OF TREE BRANCHES

[76] Inventors: Doyle W. Roark; Carolyn K. Roark, both of 1003 Malaga Ave., Wenatchee, Wash. 98801

[21] Appl. No.: 250,697

[22] Filed: Apr. 3, 1981

[51] Int. Cl.³ .............................................. A01G 17/06
[52] U.S. Cl. ....................................................... 47/42
[58] Field of Search ................................... 47/42–47; 285/396; 279/76–78; 248/351–353; 135/15 PQ; 403/104, 106, 109

[56] References Cited

U.S. PATENT DOCUMENTS

| | | | |
|---|---|---|---|
| 918,579 | 4/1909 | Murch | 256/21 |
| 1,156,083 | 10/1915 | Karges | 135/15 PQ |
| 1,214,622 | 2/1916 | Walker | 285/396 |
| 1,998,031 | 4/1935 | Thomas | 47/47 |
| 2,483,396 | 10/1949 | Benson | 403/109 X |
| 3,516,200 | 6/1970 | Marin | 47/43 |
| 4,329,076 | 5/1982 | Coreth | 403/109 |

FOREIGN PATENT DOCUMENTS 355672 6/1922 Fed. Rep. of Germany .......... 47/42

Primary Examiner—James R. Feyrer

[57] ABSTRACT

Two elongated tubes (11) (13) have respective diameters such that one tube (13) can nest inside the other tube (11). The two tubes (11) (13) are long enough that when the inner tube (13) is extended from its nested position, the overall length of the two tubes (11) (13) is in a range suitable for supporting or spreading tree branches. The interior surface (26) of the outer tube (11) has thereon a first plurality of raised portions which mate with a second plurality of raised portions on the exterior surface (28) of the inner tube (13) such that when the two tubes (11) (13) are in one rotational relationship, relative longitudinal movement of the two tubes (11) (13) is permitted, while when the two tubes (11) (13) are in another rotational relationship, relative longitudinal movement of the two tubes (11) (13) which would tend to shorten the prop is prevented.

4 Claims, 5 Drawing Figures

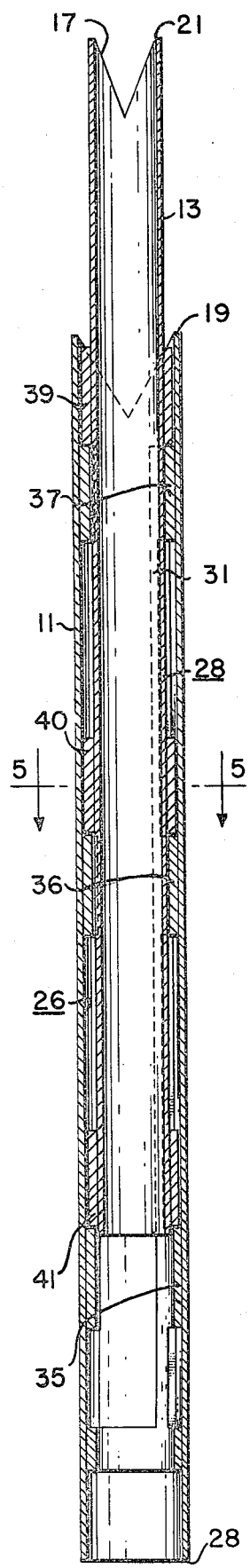
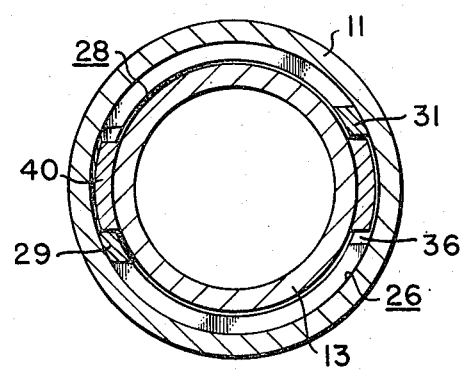
FIG. 4
FIG. 5

4,377,053

TELESCOPING PROP PARTICULARLY ADAPTED FOR SUPPORT OR SPREADING OF TREE BRANCHES

TECHNICAL FIELD

This invention relates generally to prop and spreader devices for support of tree branches and the like, and particularly concerns telescoping props.

BACKGROUND ART

Prop devices are used extensively to support the branches of fruit and nut trees to prevent the weight of the maturing fruit from breaking the branches. Also, spreading poles have been used to force trees into particular growth patterns. Historically wood poles or stakes have been used to prop the branches of trees in such situations, primarily because they have in the past been inexpensive, easy to make, and readily available. However, such wood poles have disadvantages as props because they have fixed lengths, and are susceptible to breakage. Because the length of each prop is fixed, while a particular tree, as it matures, will need different length props, it is difficult to provide props with the correct length for any tree each year. Thus, frequently, the propping of orchard trees has been less than optimum because the props provided for a particular tree are not adjustable as the tree grows from year to year.

Such disadvantages were tolerable as long as the wooden props were inexpensive. However, this is no longer true. Wooden props are becoming expensive and they are becoming increasingly difficult to obtain, particularly on short notice. Therefore, a manufactured prop is now an economical alternative.

Various attempts have been made to produce a manufactured tree prop, some of which include a telescoping feature for varying the length of the prop. The most relevant of such attempts known to the inventor are disclosed in U.S. Pat. No. 2,867,056 to Berger, and U.S. Pat. No. 3,516,200 to Marin, both of which show an adjustable prop for supporting tree branches. Other props which have an adjustable feature are shown in U.S. Pat. No. 358,017 to Cole, U.S. Pat. No. 999,908 to Tatro, and No. 477,939 to Hubbell.

The props shown in the above patents, however, are impractical, as they are too complex both in structure and operation. Such props are too expensive and too complicated for convenient usage in the field by orchard workers.

Accordingly, it is a general object of the present invention to provide a telescoping tree prop which overcomes one or more of the disadvantages of the prior art noted above.

It is another object of the present invention to provide such an article which has an adjustable length.

It is a further object of the present invention to provide such an article which is simple to use, and is durable in operation.

It is yet another object of the present invention to provide such an article which has a minimum number of parts.

It is a still further object of the present invention to provide such an article which includes simple and convenient means for contacting a tree branch.

DISCLOSURE OF INVENTION

Accordingly, the present invention includes at least two elongated prop sections, the second section being configured so that it can nest inside the first section. Means are provided on one end of the second section for contacting the branch which the prop is to support. First interlocking means are provided on the interior surface of the first section, and second interlocking means are provided on the exterior surface of the second section. The first and second interlocking means are configured such that when the two sections are in a first rotational relationship, any substantial movement of the two sections in the one longitudinal direction which would shorten the overall length of the prop is prevented, while when the two sections are in a second rotational relationship, longitudinal movement of the two sections relative to each other is permitted, so as to lengthen the overall length of the prop.

BRIEF DESCRIPTION OF THE DRAWINGS

A more thorough understanding of the invention may be obtained by a study of the following detailed description taken in connection with the accompanying drawings in which:

FIG. 4 is a longitudinal cross-section view of the article of FIG. 1.

FIG. 5 is a lateral cross-section view of the article of FIG. 1, taken along lines 5—5 in FIG. 4.

BEST MODE FOR CARRYING OUT THE INVENTION

Figure 1:
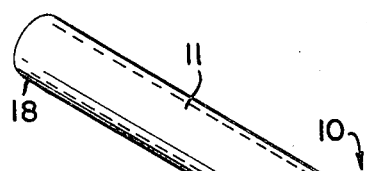
FIG. 1 is an isometric view showing the article of the present invention in a nested configuration.
Figure 2:
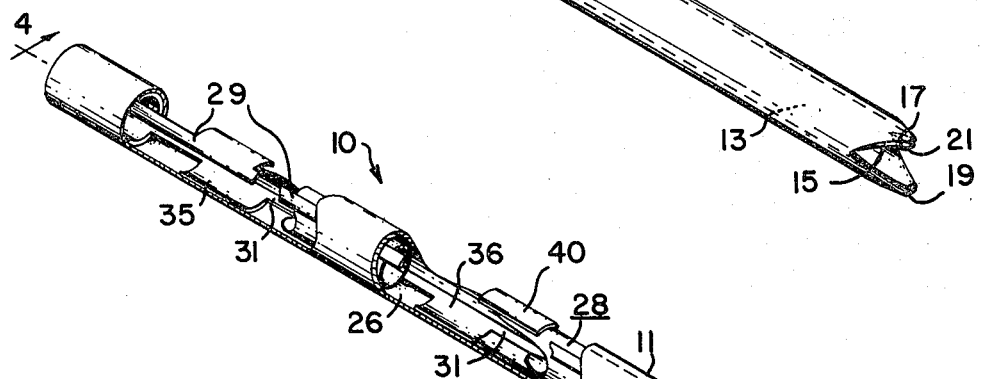
FIG. 2 is an isometric view of the article of FIG. 1 in an extended configuration.

Referring to FIGS. 1 and 2, the article of the present invention, shown generally at 10, comprises two elongated tube-like sections 11 and 13. Of course, it should be understood that the article may comprise more than two sections, with the structural principles disclosed herein being applicable to the additional sections. FIG. 1 shows the two sections 11 and 13 in a nested configuration, while FIG. 2 shows inner section 13 extended relative to the outer section 11. In the embodiment shown, both inner and outer sections 11 and 13 are round in cross-section; outer section 11 is approximately 1⅞ inches in diameter, while inner section 13 is approximately 1¼ inches in diameter.

The outer and inner sections 11 and 13, respectively, have V-shaped grooves 15, 17 in their respective upper ends 19 and 21. The outer section 11 would also have a V-shaped groove in its lower end 18 when the article is used to spread two branches. The V-shaped groove fits beneath and partially around the branch which the prop is to support. The weight of the branch aids in the branch being firmly held by the prop, because the weight of the branch forces it down into the notch at the top of the prop.

Both outer section 11 and inner section 13 have a series of raised portions on their longitudinal surfaces which mate together to provide a telescoping capability so that the length of the prop may be conveniently and easily varied. The raised portions for outer section 11 are on the interior surface 26 of the outer section, while the raised portions for inner section 13 are on the exterior surface 28 of the inner section. When inner section 13 is placed inside outer section 11, the raised portions on the respective sections mate together in a particular manner which both permits or prevents relative longitudinal movement of the two sections, depending upon the particular rotational or angular relationship between the two sections.

In the embodiment shown, the raised portions are an integral part of the outer and inner sections 11 and 13. This may be accomplished, for instance, by conventional molding techniques, in which the pattern for the sections includes the raised portions. However, it should be understood that the raised portions may be accomplished in other ways, such as by attaching portions of hard rubber or plastic having the desired configuration to the appropriate surfaces of the outer and inner sections. Also, it is possible that the raised portions for each section may be constructed in one piece, and then secured to the appropriate surface of the sections.

The actual configuration of the raised portions in the embodiment shown are shown in more detail in FIG. 4, which is a longitudinal cross-section view, and FIG. 5, which is a lateral cross-section view. The raised portions on the interior surface of outer section 11 include two longitudinal strips 29 and 31, which extend from a point several inches above the lower end 28 of the section to a point several inches below the upper end 19. These longitudinal strips are approximately ⅜ths inch wide, and are opposite from each other, separated by approximately 180°. The length and width of the longitudinal strips can be varied.

Aligned along one side of each longitudinal strip at spaced intervals are three lock blocks, one set of which is shown at 35, 36 and 37. These lock blocks are approximately ½ inch by 2 inches and in the embodiment shown are separated by approximately 4½ inches. More lock blocks can be provided, of course, depending upon the length of the outer section, and the number of relative positions, i.e. the possible height variations, desired. Three lock blocks similar to lock blocks 35, 36 and 37 are provided with the other longitudinal strip, at approximately the same relative longitudinal position along the length of the section. The two sets of lock blocks on outer section 11 thus oppose each other, like longitudinal strips 29 and 31. The longitudinal strips and the lock blocks are all approximately ⅛th inch high in the embodiment shown and form one-half of the interlocking structure for the telescoping prop of the present invention. In the embodiment shown, the longitudinal strips and associated lock blocks are all in the form of raised portions, of the noted dimensions, on the interior surface of the outer section.

The other half of the interlocking structure for the telescoping prop is provided by the raised portions on the exterior surface of the inner section 13. The raised portions on the inner section 13 include two sets of lock blocks, one set of which is shown at 39, 40 and 41, positioned at spaced intervals along the length of the inner section 13. Each set of three lock blocks is aligned length-wise and oppose each other, with the centerline of each set of lock blocks being separated by 180°. The number of lock blocks in each set on the exterior surface of the inner section 13 will typically equal the number of lock blocks on the inner surface outer section 11. The number of lock blocks on inner section 13 can be varied, just as the number of lock blocks on outer section 11 can be varied.

The lock blocks 39, 40 and 41 in the embodiment shown have substantially the same configuration and dimensions as lock blocks 35, 36 and 37, and are hence approximately ½ inch by 2 inches and are approximately ⅛th inch high. The lock blocks on the two sections and the longitudinal strips on the outer section are generally configured such that there is a sufficient lateral distance between the lateral edge of the lock blocks in each set on outer section 11 and the edge of the longitudinal strip associated with the opposed set of lock blocks, to permit the lock blocks on the inner section to move therebetween, so that when the two sections are in one rotational relationship relative to each other, the two sections can be moved longitudinally relative to each other, typically in both longitudinal directions, but at least in the direction which would lengthen the prop, while when the two sections are in another rotational relationship, the bottom edge of one or more of the lock blocks on the inner section abuts the top edge of a lock block on the outer section, thus preventing any substantial longitudinal movement between the two sections, at least in the downward direction, i.e. in the direction which would tend to shorten the prop.

In use, the notched upper end 21 of inner section 13 is inserted into the lower end 18 of outer section 11 and then rotated until the rotational relationship between sections 11 and 13 is such that inner section 13 may be moved longitudinally further into outer section 11. Inner section 13 is moved into outer section 11 sufficiently that the notched upper end 21 of inner section 13 extends beyond the notched upper end 19 of outer section 11, and then further, until the length of the two sections is the desired length of the prop or spreader.

The two sections 11 and 13 are then rotated until the respective lock blocks on the two sections are in vertical registry, which prevents further longitudinal movement of the two sections relative to each other, at least any movement which would tend to shorten the prop length. The resulting prop is longitudinally rigid. If it is desired to change the length of the prop, the two sections are rotated relative to each other until the desired prop length has been achieved, and then the two sections are rotated again to their locking relationship.

As mentioned above, the telescoping prop/spreader shown and described herein may comprise more than two sections. If this is the case, then the outermost section will include raised portions on its interior surface, the innermost section will include raised portions on its exterior surface, while the intermediate sections, whatever number, will include raised portions both on their exterior and interior surfaces. Also, as mentioned above, it should be understood that the number of lock blocks on the respective sections can be varied, depending upon the number of possible lengths desired for the prop.

Figure 3:
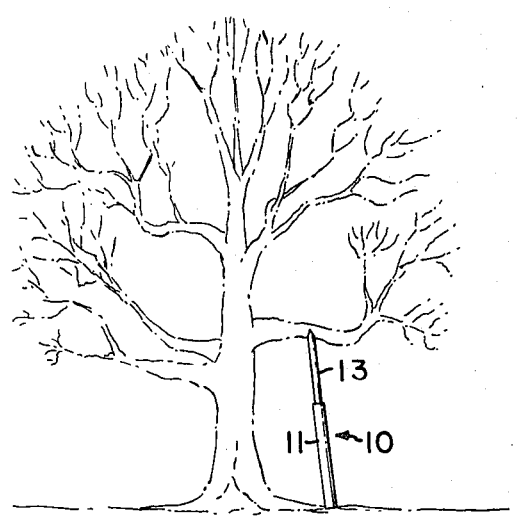
FIG. 3 is an environmental view showing the article of the present invention in use.
Figure 3:
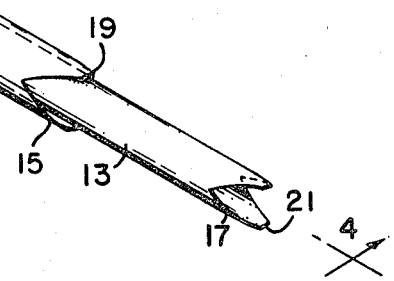

The prop is convenient to use. Its most common application will be in fruit tree orchards, either to support branches from the ground as the fruit on the tree matures and the branches begin to droop, or to spread two branches apart to force a wide gap. FIG. 3 shows the prop in use from the ground with a fruit tree. As the trees continue to mature and grow, the same props can be utilized, since the length of the prop is variable. Since the prop shown and disclosed herein is simple in overall construction with a minimum number of parts, there are no parts, such as pegs, which can be easily lost. Also, if one or more sections of the prop become damaged or broken, it is convenient to replace them. The prop is also easy to operate, as changing the length demands only a simple rotation of the sections.

Thus, a prop for support of tree branches has been described which has a variable length capability, yet which is simple to use and quite durable. Since the props may be made out of a plastic material, and molded, they can be inexpensively manufactured in large quantities, and in bright colors, which provides rapid location of the props in the field, thus preventing accidental damage or breakage by tractors and the like.

Although a preferred embodiment of the invention has been disclosed herein for purposes of illustration, it will be understood that various changes, modifications and substitutions may be incorporated in such embodiment without departing from the spirit of the invention as defined by the claims which follow.

We claim:

1. A telescoping prop for support and/or spreading of tree branches comprising:
   at least two elongated prop sections, the second section being configured so that it can nest inside the first section, wherein at least one end of the telescoping prop has a notch or the like formed therein for maintaining contact with the branch which the prop is to support; and
   a first plurality of raised portions formed as an integral part of the interior surface of the first section and a second plurality of raised portions formed as an integral part of the exterior surface of the second section, said plurality of first and second raised portions being positioned at spaced intervals along the length of the first and second prop sections, respectively, said first plurality of raised portions being configured to mate with said second plurality of raised portions in a partially surrounding relationship when the two sections are in a first rotational relationship, in any one of a plurality of different longitudinally extended positions, so that in the first rotational relationship substantially any longitudinal movement which would tend to shorten the prop is prevented, said first plurality of raised portions being further configured so that there is a longitudinal path on the interior surface of the first section along which the second plurality of raised portions can move longitudinally when the two sections are in a second rotational relationship, so that in the second rotational relationship, longitudinal movement of the first and second sections relative to each other to change the length of the prop is permitted.

2. The apparatus of claim 1, wherein a notch or the like is formed in both ends of the telescoping prop for maintaining contact with tree branches.

3. The apparatus of claim 1, wherein the second plurality of raised portions includes at least two sets of first blocks, separated by 180°, each set comprising a plurality of relatively small, thin blocks in vertical registry, and wherein said first plurality of raised portions includes two longitudinal strips separated by 180° and extending substantially the length of the prop section on which they are located, and at least two sets of second blocks at spaced intervals along the length of the said one prop section, the sets of second blocks extending, respectively, from the respective longitudinal strips, leaving a space between the end of each second block and the opposed longitudinal strip sufficiently wide to permit longitudinal passage of the first blocks.

4. The apparatus of claim 1, including at least one intermediate prop section, which nests between the first and second elongated prop sections, said intermediate prop section having a first plurality of raised portions on its interior surface, and a second plurality of raised portions on its exterior surface.

* * * * *